W. J. SLEFFEL.
AXLE CONSTRUCTION.
APPLICATION FILED DEC. 18, 1912.

1,141,078.

Patented May 25, 1915.

WITNESSES:
Oliver M. Kappler
Horace B. Fay

INVENTOR
William J. Sleffel
BY Fay and Oberlin
ATTORNEYS

UNITED STATES PATENT OFFICE.

WILLIAM J. SLEFFEL, OF CLEVELAND, OHIO, ASSIGNOR TO THE KIRK LATTY MANUFACTURING COMPANY, OF CLEVELAND, OHIO, A CORPORATION OF OHIO.

AXLE CONSTRUCTION.

1,141,078.   Specification of Letters Patent.   Patented May 25, 1915.

Application filed December 18, 1912. Serial No. 737,417.

*To all whom it may concern:*

Be it known that I, WILLIAM J. SLEFFEL, a citizen of the United States, and a resident of Cleveland, county of Cuyahoga, and State of Ohio, have invented a new and useful Improvement in Axle Construction, of which the following is a specification, the principle of the invention being herein explained and the best mode in which I have contemplated applying the principle, so as to distinguish it from other inventions.

The invention which forms the subject matter of the present application consists of an improved axle construction which permits the attachment of a hub to an axle without the necessity for using a nut or similar retaining means.

The invention is particularly adapted, and is intended, for use on small vehicles, such as are manufactured for children, as it is especially desirable in that line of articles to so construct them that there will be no necessity for replacing or adjusting any of the parts, although it is as essential in these vehicles as in larger ones to use a strong and permanent construction. It is of course not difficult to design vehicles to serve the uses above mentioned, but is often a matter of extreme difficulty to design such a construction which will have the desirable features mentioned and at the same time be simple and cheap to manufacture.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
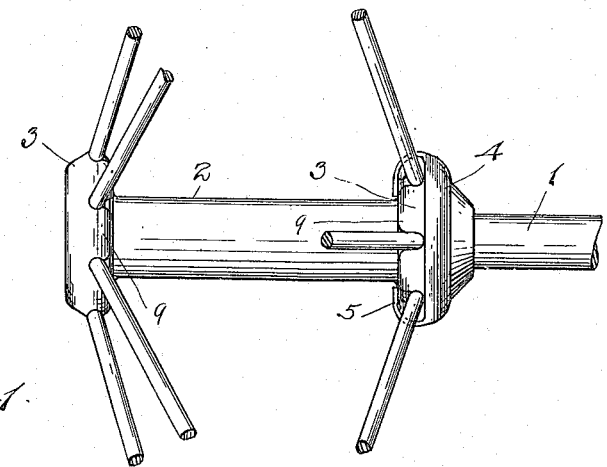
Figure 2:
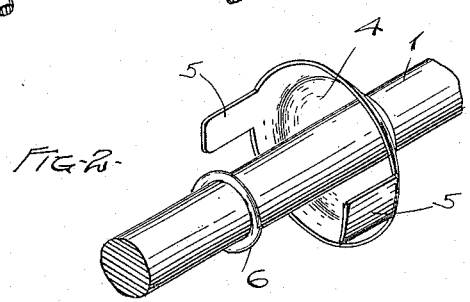
Figure 3:
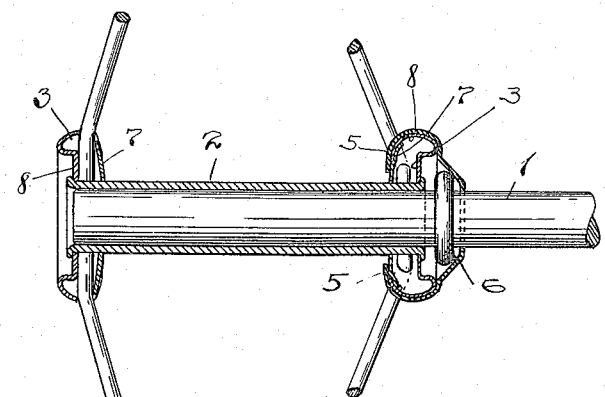

In said annexed drawing:—Figure 1 is a side elevation showing a hub disposed upon an axle, the construction embodying the present invention; Fig. 2 is a perspective view of the axle and retaining means in their operative relation; and Fig. 3 is a central vertical section through an axle and hub showing the retaining means in engagement with the same.

In Fig. 1 there is shown an axle 1 of the usual type upon which is mounted a tubular hub 2 attached at either end to disks 3 which bear the spokes extending to the rim (not shown) of the wheel. The form of hub shown is simply and conveniently formed of two outwardly facing disks 7, attached at either end of the tubular portion 2, and two inwardly facing complementary disks 8 provided with flexible fingers or arms 9 which may be bent over the disks 7 when the hub is assembled. The spokes are carried by the disks 7, the arms 9 interlocking between them as best illustrated in Fig. 1. The neatness and compactness of this form of hub will be readily observed.

The retaining means are particularly adapted to coöperate with the hub already described. The means then consist of a retaining member or disk 4 provided with a plurality of radially extending flexible arms which are adapted to be bent over the periphery of the hub between the spokes. The disk 4 is formed to conform with the disk 8, thereby affording a very compact structure. It will be seen that the disks 4 and 8 do not contact except at their outer portions, forming a circular chamber about the axle, upon which the disk 4 is slidably and rotatably engaged as it is provided with a central circular aperture. This chamber surrounds a shoulder 6 attached to the axle and against this the disk 4 is adapted to engage. Upon the axle there is provided a concentrically formed shoulder 6 against which the retaining member is adapted to engage, the aperture in the retaining member being smaller than the shoulder on the axle. In this way the hub and the retaining member are together secured upon the axle without the use of a nut or equivalent means, and the advantage secured is that it is impossible for the wheel to disengage from the axle until the retaining member is disengaged from the hub, which cannot happen during ordinary use of the vehicle. Another advantage which is secured is that lubricant from the bearing portion of the axle is not permitted to leak along the axle, since the engagement between the retaining member and the axle is such that it is unlikely that lubricant will leak therebetween.

It will be readily seen by those who are familiar with the problems occurring in the manufacture of children's vehicles, that the present invention affords a simple and cheap method of attaching a hub to an axle. Furthermore, it is practically impossible for the hub to ever disengage during use from the axle, and there need be no adjustment or replacement of nuts or similar articles. A further advantage of the present construction is the compact hub thus formed which may be assembled with but little difficulty although it is extremely durable and also neat in appearance.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a wheel structure, the combination of an axle provided with a shoulder spaced from the end of said axle; a wheel hub, consisting of spaced disks connected by a tubular portion, the latter slidably and rotatably engaging on said axle against such shoulder; a centrally apertured disk fitted over said axle and on the inner side of such shoulder, the aperture permitting said disk to slide over said axle but not such shoulder, thereby retaining said disk on said axle; and a plurality of flexible arms extending radially outward from said disk, said arms being bent over the adjacent disk on said hub, thereby retaining the latter on said axle.

Signed by me, this 13" day of December, 1912.

WILLIAM J. SLEFFEL.

Attested by—
HARRY D. REED,
EMIL J. LUTTNER.

Copies of this patent may be obtained for five cents each, by addressing the "Commissioner of Patents, Washington, D. C."